United States Patent
Osiecki et al.

(10) Patent No.: US 6,629,767 B2
(45) Date of Patent: Oct. 7, 2003

(54) LIGHTING DEVICE

(75) Inventors: Scott W. Osiecki, Skaneateles, NY (US); Mark A. Ferguson, Memphis, NY (US); David A. Furth, Skaneateles, NY (US); Ronald J. Kingston, Syracuse, NY (US)

(73) Assignee: Eveready Battery Company, Inc., St. Louis, MO (US)

( * ) Notice: Subject to any disclaimer, the term of this patent is extended or adjusted under 35 U.S.C. 154(b) by 0 days.

(21) Appl. No.: 09/939,104

(22) Filed: Aug. 24, 2001

(65) Prior Publication Data

US 2003/0039118 A1 Feb. 27, 2003

(51) Int. Cl.$^7$ .................................................. F21L 4/04
(52) U.S. Cl. ........................ 362/202; 362/208; 362/194; 362/196
(58) Field of Search ................................ 362/208, 202, 362/200, 190, 189, 390, 369, 194, 196; D26/48, 37, 60, 104, 46

(56) References Cited

U.S. PATENT DOCUMENTS

| | | | | |
|---|---|---|---|---|
| 3,175,080 A | * | 3/1965 | Moore | 362/196 |
| 3,456,102 A | | 7/1969 | Brindley et al. | |
| 3,737,650 A | * | 6/1973 | Kaye et al. | 362/191 |
| 4,203,150 A | | 5/1980 | Shamlian | |
| 4,443,833 A | * | 4/1984 | Fazzina | 362/189 |
| 4,480,294 A | | 10/1984 | Carboni | |
| 4,524,409 A | * | 6/1985 | Yakubek | 200/60 |
| 4,875,147 A | * | 10/1989 | Auer | 362/157 |
| 4,926,300 A | * | 5/1990 | Ralston | 362/189 |
| 4,940,860 A | | 7/1990 | Shiau | |
| 5,081,568 A | * | 1/1992 | Dong et al. | 340/321 |
| 5,272,606 A | * | 12/1993 | Blaney | 362/157 |
| 5,590,951 A | * | 1/1997 | Matthews | 362/203 |
| 5,667,293 A | * | 9/1997 | Own | 362/184 |
| 5,683,831 A | | 11/1997 | Baril et al. | |
| 5,720,543 A | | 2/1998 | Sheps | |
| D394,322 S | | 5/1998 | Dalton et al. | D26/48 |
| 5,800,045 A | | 9/1998 | Kish et al. | |
| D415,850 S | | 10/1999 | Dalton et al. | D26/48 |
| 6,231,208 B1 | | 5/2001 | Dalton et al. | |
| 6,250,771 B1 | * | 6/2001 | Sharrah et al. | 362/184 |

FOREIGN PATENT DOCUMENTS

| | | |
|---|---|---|
| DE | 29904650 | 6/1999 |
| FR | 1347134 | 11/1963 |
| FR | 2361603 | 3/1978 |
| GB | 1059662 | 2/1967 |
| JP | 62-193057 | 8/1987 |
| WO | 9967567 | 12/1999 |
| WO | 0133137 | 5/2001 |

OTHER PUBLICATIONS

Patent Abstracts of Japan, Publication No. 62193057, Aug. 24, 1987.

* cited by examiner

*Primary Examiner*—Sandra O'Shea
*Assistant Examiner*—Hargobind S. Sawhney
(74) *Attorney, Agent, or Firm*—Robert W. Welsh (57) ABSTRACT

The portable lighting device of the present invention includes a casing defining a battery compartment. The battery compartment may be lined with a shock absorbing material and may be configured to receive a plurality of batteries arranged in at least two rows that are offset with respect to one another. The casing may define two support surfaces with one inclined with respect to the other. A battery cartridge may be used in the lighting device that has a pivoting handle to aid in removal of the cartridge from the battery compartment. A reflector isolator may also be employed to reduce mechanical shock transferred to the lamp. A lantern so constructed can withstand drops of up to 15 feet or more.

46 Claims, 7 Drawing Sheets

LIGHTING DEVICE

BACKGROUND OF THE INVENTION

The present invention generally relates to portable lighting devices, such as flashlights and lanterns.

Flashlights and lanterns have evolved considerably over the past several years and are often designed for special uses. For example, some lights may be waterproof, some may have features that enable them to be used as both a spotlight and area illuminator, some function as a combination nightlight/flashlight, and some are configured to function as work lights. While some lights have been configured to withstand drops of a considerable height such as, for example, 5 feet, such lights have not been configured to survive drops of much greater heights, for example, 15 feet. When dropped from such heights at various drop angles, not only is there a high likelihood that the plastic casing will crack, but the lamp bulb will typically break along with any lens or other optics in the device. Additionally, in many such lights, the batteries used to power the light may become crushed. Nevertheless, there exists a need for a portable lighting device that can withstand abusive treatment as may be experienced by a typical work light as used, for example, in the construction industry.

SUMMARY OF THE INVENTION

According to one embodiment of the present invention, a portable lighting device is provided that comprises: a casing including a top, bottom, rear and opposing side surfaces, and an open forward end; a reflector mounted within the open forward end of the casing; a lens provided across the forward open end; a light source disposed between the reflector and the lens; and a switching mechanism for selectively activating the light source. The bottom surface of the casing provides a first support surface on which the portable lighting device may rest when in a first resting position. The casing further includes an inclined surface extending between the bottom surface and the rear surface of the casing. The inclined surface provides a second support surface on which the portable lighting device may rest when in a second resting position.

According to another embodiment of the present invention, a portable lighting device is provided that comprises: a casing defining a battery compartment and including an open forward end and a light source selectively electrically coupled to batteries in the battery compartment. The battery compartment is configured to receive four batteries arranged in two rows of two batteries each. The battery compartment is further configured to maintain the batteries in a first row offset from the batteries in a second row.

According to another embodiment of the present invention, a portable lighting device is provided that comprises: a casing defining a battery compartment; a shock absorber lining at least a portion of the battery compartment to protect batteries contained therein from damage due to excessive shock applied to said casing; and a light source selectively electrically coupled to batteries in the battery compartment.

According to another embodiment of the present invention, a portable lighting device is provided that comprises: a casing defining a battery compartment and having an open end for access to the battery compartment and a lens ring assembly releasably attached to the open end of said casing. The lens ring assembly comprises: a lens; a lens ring for supporting said lens and including connecting means for connecting said lens ring assembly to said casing; a light source; a reflector having a forward peripheral rim and a rear aperture for receiving said light source; and a gasket disposed between said forward peripheral rim of said reflector and an inner surface of said lens ring. The gasket is formed of a material capable of absorbing mechanical shocks so as to protect said light source from mechanical shocks delivered to said lens ring and/or casing.

According to another embodiment of the present invention, a battery cartridge is provided for a portable light device having a battery compartment for receiving the battery cartridge. The battery cartridge comprises: a cartridge support structure including at least one battery receptacle for receiving a battery and a handle pivotally attached to said cartridge support structure for pivoting between a storage position and an extended position for facilitating removal/insertion of the battery cartridge into the battery compartment.

According to another embodiment of the present invention, a battery cartridge is provided for a portable light device having a battery compartment for receiving the battery cartridge. The battery cartridge comprises a cartridge support structure including battery receptacles configured to receive four batteries arranged in two rows of two batteries each, the battery receptacles further configured to maintain the batteries in a first row offset from the batteries in a second row.

According to another embodiment of the present invention, a portable lighting device is provided that comprises: a casing defining a battery compartment and being formed of at least two casing portions; a gasket disposed between the casing portions; a light source; and a switching mechanism electrically coupled between at least one terminal of a battery contained in the battery compartment and the light source. The switching mechanism extends between the two casing portions to enable actuation by a user. The gasket includes an integrally formed resilient boot constituting a portion of the switching mechanism.

These and other features, advantages, and objects of the present invention will be further understood and appreciated by those skilled in the art by reference to the following specification, claims, and appended drawings.

DETAILED DESCRIPTION OF THE PREFERRED EMBODIMENT

Reference will now be made in detail to the present preferred embodiments of the invention, examples of which are illustrated in the accompanying drawings. Wherever possible, the same reference numerals will be used throughout the drawings to refer to the same or like parts.

For purposes of description herein, the terms "upper," "lower," "right," "left," "rear," "front," "vertical," "horizontal," "top," "bottom," and derivatives thereof shall relate to the invention as viewed by a person holding the flashlight/lantern in a generally horizontal position with the light beam emitted from the front of the flashlight/lantern in a forward direction. However, it is to be understood that the invention may assume various alternative orientations, except where expressly specified to the contrary. It is also to be understood that the specific device illustrated in the attached drawings and described in the following specification is simply an exemplary embodiment of the inventive concepts defined in the appended claims. Hence, specific dimensions, proportions, and other physical characteristics relating to the embodiment disclosed herein are not to be considered as limiting, unless the claims expressly state otherwise.

A lantern constructed in accordance with the present invention is shown in FIGS. 1–8. While a lantern is shown and described, it will be appreciated by those skilled in the art that the various aspects of the present invention may be applied to flashlights and other forms of portable lighting devices. The lantern of the present invention will now be described in detail with reference to all of FIGS. 1–8.

The lantern of the present invention comprises a casing assembly 10 including a casing 12 that may be formed of two casing halves 12a and 12b (FIG. 7A) that are formed of a hard plastic material. As will be explained in more detail below, casing assembly 10 may further include a case gasket 14 that extends about the entire interface between casing halves 12a and 12b so as to provide a watertight seal.

Casing 12 includes a top surface 16, a bottom surface 18, a rear surface 20, and opposed side surfaces 20a and 20b. Casing 12 is further configured to include an open forward end 24 for providing access to a battery compartment 26 defined within casing 12. Casing halves 12a and 12b may be joined using common pin and hole connections or using screws or other known fastening means. Around the open end 24 of casing 12, casing 12 includes a cylindrical protrusion having threads 28 formed on an outer surface thereof for engaging the threads 106 (FIG. 8) on the inner surface of a lens ring assembly 70, which is described further below. Threads 28 allow lens ring assembly 70 to be releasably secured across the open end of casing 12 and thereby allow access to battery compartment 26.

Casing assembly 10 further includes a handle 30 having a tongue 34 (see FIG. 8) formed at its rear end for engagement with a slot 32 that is provided on a rearward portion of top surface 16 of casing 12. Handle 30 further includes a pair of lips 38 on opposite sides of a forward portion of handle 30 for insertion in corresponding front handle slots 36 in casing halves 12a and 12b. With this configuration, handle 30 may be inserted into the slots of a first casing half and then secured in place at such time that the other casing half is secured to the first casing half.

Casing assembly 10 may further include a base tray 40, which may also be made of a hard plastic material and which is secured to the bottom and rear surfaces of casing halves 12a and 12b after the halves have been secured to one another. Base tray 40 thus serves to retain halves 12a and 12b in a mating relation while also providing additional rigidity and strength to the lantern. A base overmold 42 may be secured to base tray 40 by means of adhesive, thermal or mechanical attachment, or by chemical bond. Base tray 40 may be eliminated and base overmold 42 may alternatively be secured directly to casing halves 12a and 12b by adhesive, thermal or mechanical attachment, or by chemical bond. Base overmold 42 may be made of a material having a higher coefficient of friction than the material from which casing 12 is made so as to provide nonskid support surfaces upon which the lantern may be rested. When used as a work light, it is conceivable that the lantern may be placed on surfaces that are inclined with respect to horizontal, and thus, by providing nonskid surfaces, the lantern may be less likely to slide along the inclined surface. The material from which base overmold 42 is made also preferably functions as a shock absorber to absorb the mechanical shock that otherwise may be experienced by casing 10 when the lantern is dropped from any considerable height. A suitable material from which base overmold 42 may be made is rubber, although other materials may be used. Base overmold 42 may further be configured to include a plurality of treads 44 that further enhance the nonskid and shock absorbing features of base overmold 42 while providing certain aesthetic appeal.

Casing 12, base tray 40, and base overmold 42 may be configured to form two or more support surfaces on which the lantern may rest when in respective first and second resting positions. Specifically, bottom surface 18 of the lantern may function as a first support surface upon which the lantern may rest when in a first resting position. An inclined second support surface 25 may be provided that extends at an angle relative to bottom surface 18 of, for example, approximately 45 degrees toward rear surface 20 of the lantern. By providing a second support surface at, for example, 45 degrees, a user may readily change the direction at which light is projected relative to horizontal by resting the lantern on second support surface 25. As will be apparent from FIG. 8, the lantern may be configured such that light is projected in a generally downward angle relative to horizontal when the lantern is rested on the bottom support surface 18. This will allow the lantern to be placed on the work surface that is intended to be illuminated or upon a parallel or nonparallel surface positioned above the work surface.

To facilitate the ability of the lantern to be rested on second support surface 25, the battery compartment 26 within casing 10 may be configured to receive a plurality, i.e., four batteries, arranged in two or more rows of, for example, two batteries each, with the batteries in a first row laterally offset from the batteries in a second row (see, for example, FIGS. 7A, 7B, 8, 9A, and 9B). By offsetting the upper row of batteries rearward within the battery compartment, the weight distribution and center of gravity is shifted rearward so as to increase the stability of the lantern when placed on second resting surface 25.

The lantern may further include a battery cartridge 100 that is removably inserted into battery compartment 26. The battery cartridge includes a support structure 104 in which a plurality of battery receptacles is defined for receiving batteries 102. As apparent from the drawings, the battery cartridge is preferably configured so as to retain batteries 102 in rows that are offset from one another.

Casing assembly 10 may further include a shock absorber 48 for lining at least a portion of battery compartment 26 to protect and isolate batteries 102 from damage due to excessive shock applied to the exterior of the lantern. Shock absorber 48 is preferably made of a resiliently compressible material such as a foam material or the like. Shock absorber 48 may be molded in one or more pieces to fit precisely within the interior space defined by casing 12 and fit snugly around battery cartridge 100. By providing shock absorber 48, batteries 102 are unlikely to be crushed due to the excessive force that may otherwise be transferred to the lantern body to batteries 102.

Casing assembly 10 may further include one or more armor plates 50 made of metal or the like that are fastened to sides 22a and 22b of casing 12 by means of screws 52 or other fastening means. Plates 50 not only strengthen the lantern assembly, but also serve to deflect and spread out the force of an impact across a larger surface area of casing 12.

Figure 8:
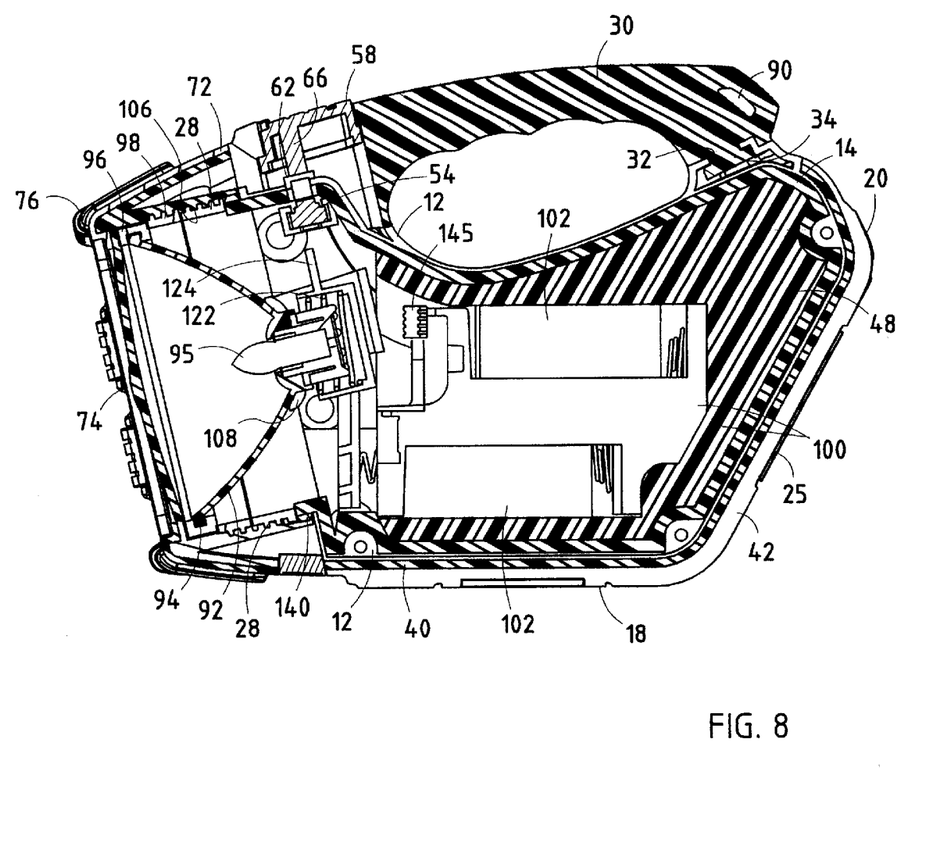
FIG. 8 is a cross-sectional view taken along line VIII—VIII of FIG. 2.

A lantern of the present invention further includes a switch for selectively coupling batteries 102 to one of the terminals of a light source 95. The switch includes a switching mechanism 54 that may be retained within a slot 56 formed within casing 12. The switch further includes a first switch boot 58, which may be made of rubber or like material, and which extends through an aperture 60 formed in handle 30. Additionally, the switch includes a second boot 62 that is integrally formed within case gasket 14. Second boot 62, as well as case gasket 14, is preferably made of a resilient material, such as a soft rubber or the like. Second boot 62 projects upward through an aperture 64 formed in case 12 in an area underlying aperture 60 in handle 30. As best shown in FIG. 8, first switch boot 58 includes a plunger 66 that is pressed downward when the user depresses the switch boot 58 so as to slightly deform second boot 62 and press against the actuator of switch mechanism 54. Switch mechanism 54 may be a pushbutton-type switch that toggles between a closed and opened state based upon the depression of its actuator. Switch mechanism 54 may also be a slide-, pivot-, or rotation-type switch. By integrally forming second boot 62 in case seal 14, better protection is provided against the ingress of moisture into the interior of casing 12 to thereby provide a waterproof lantern.

Figure 1:
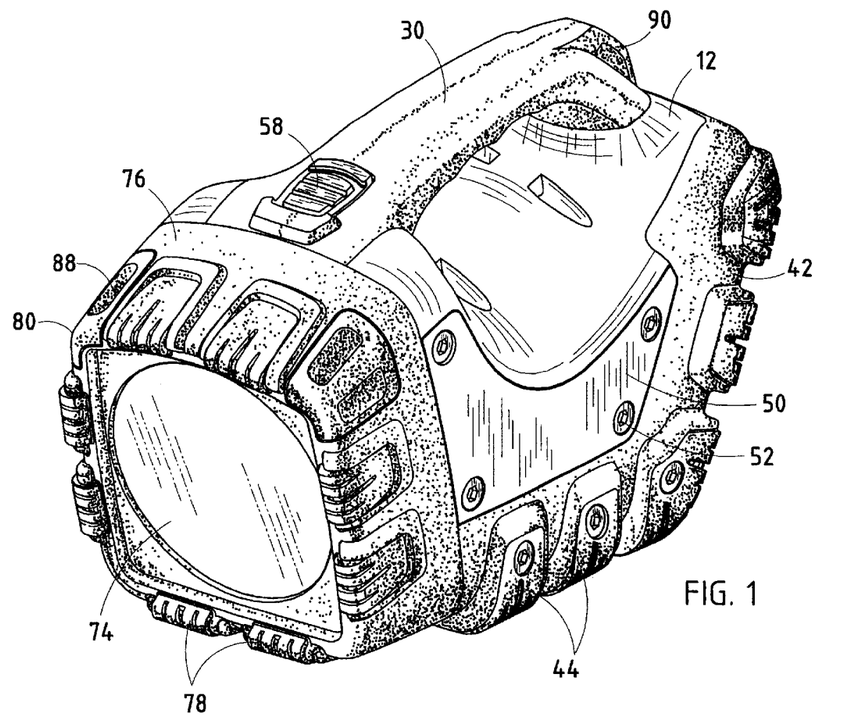
FIG. 1 is a perspective view showing the front, top, and one side of a lantern constructed in accordance with the present invention.
Figure 2:
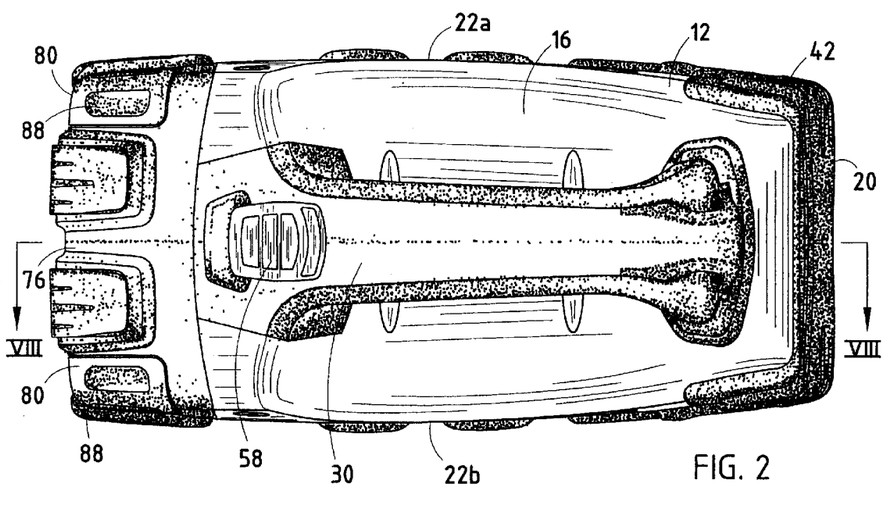
FIG. 2 is a plan view showing the top of the lantern of the present invention.
Figure 3:
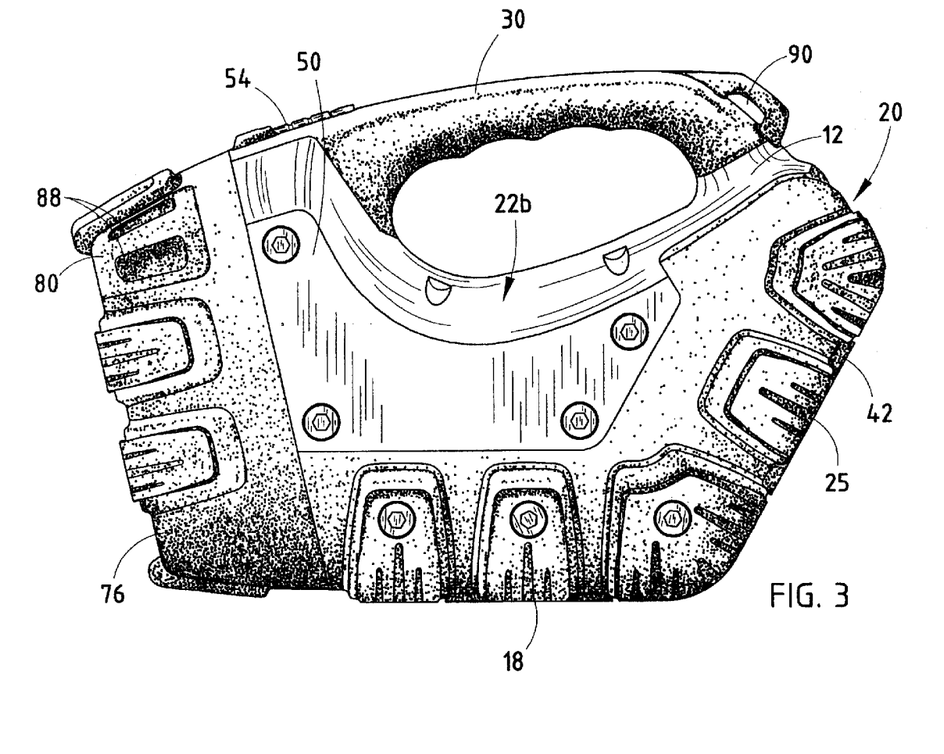
FIG. 3 is a side elevational view of the lantern of the present invention.
Figure 4:
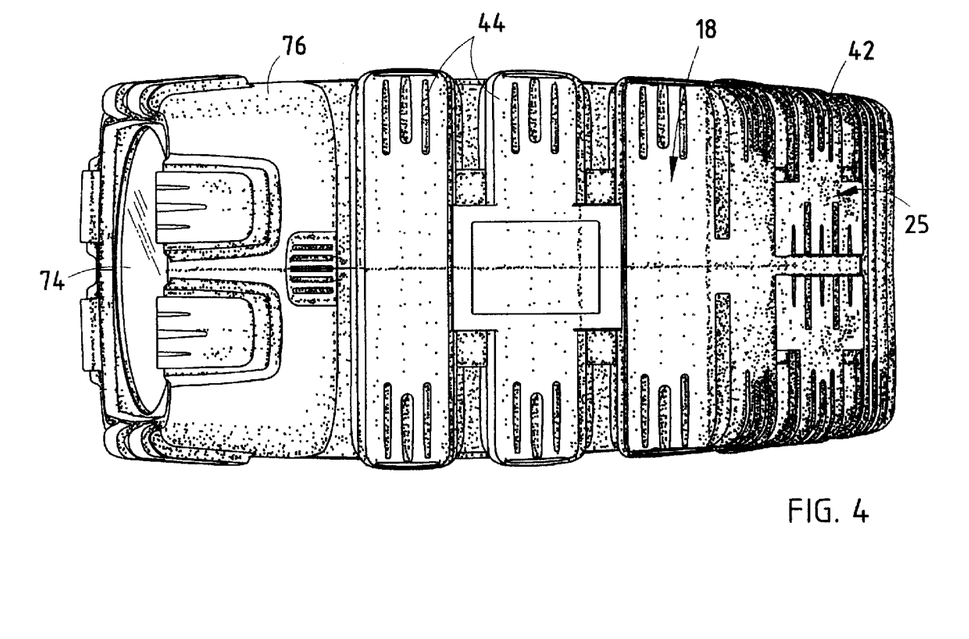
FIG. 4 is a plan view of the bottom of the flashlight of the present invention.
Figure 5:
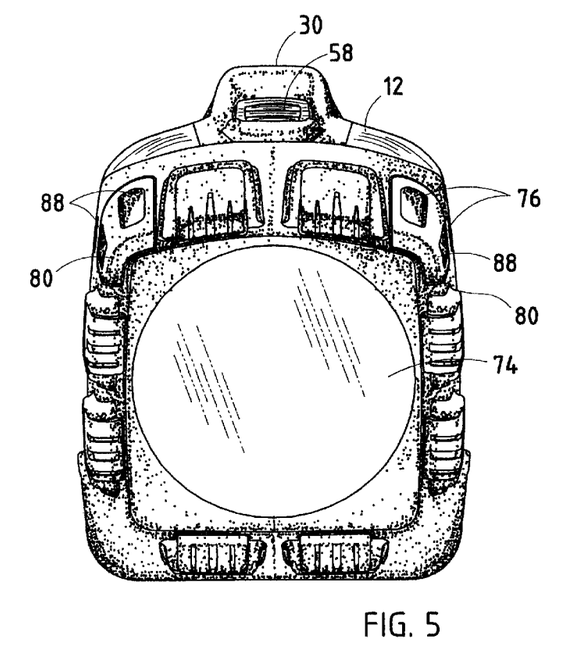
FIG. 5 is an elevational view showing the front of the lantern of the present invention.
Figure 6:
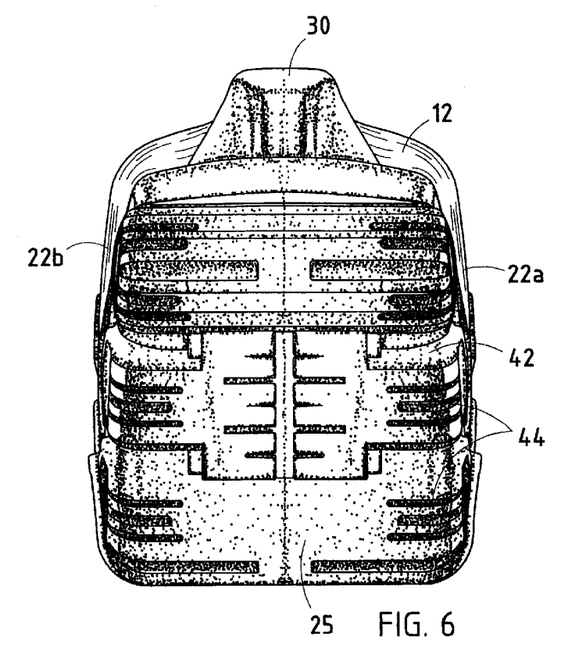
FIG. 6 is an elevational view showing the rear of the lantern of the present invention.
Figure 7A:
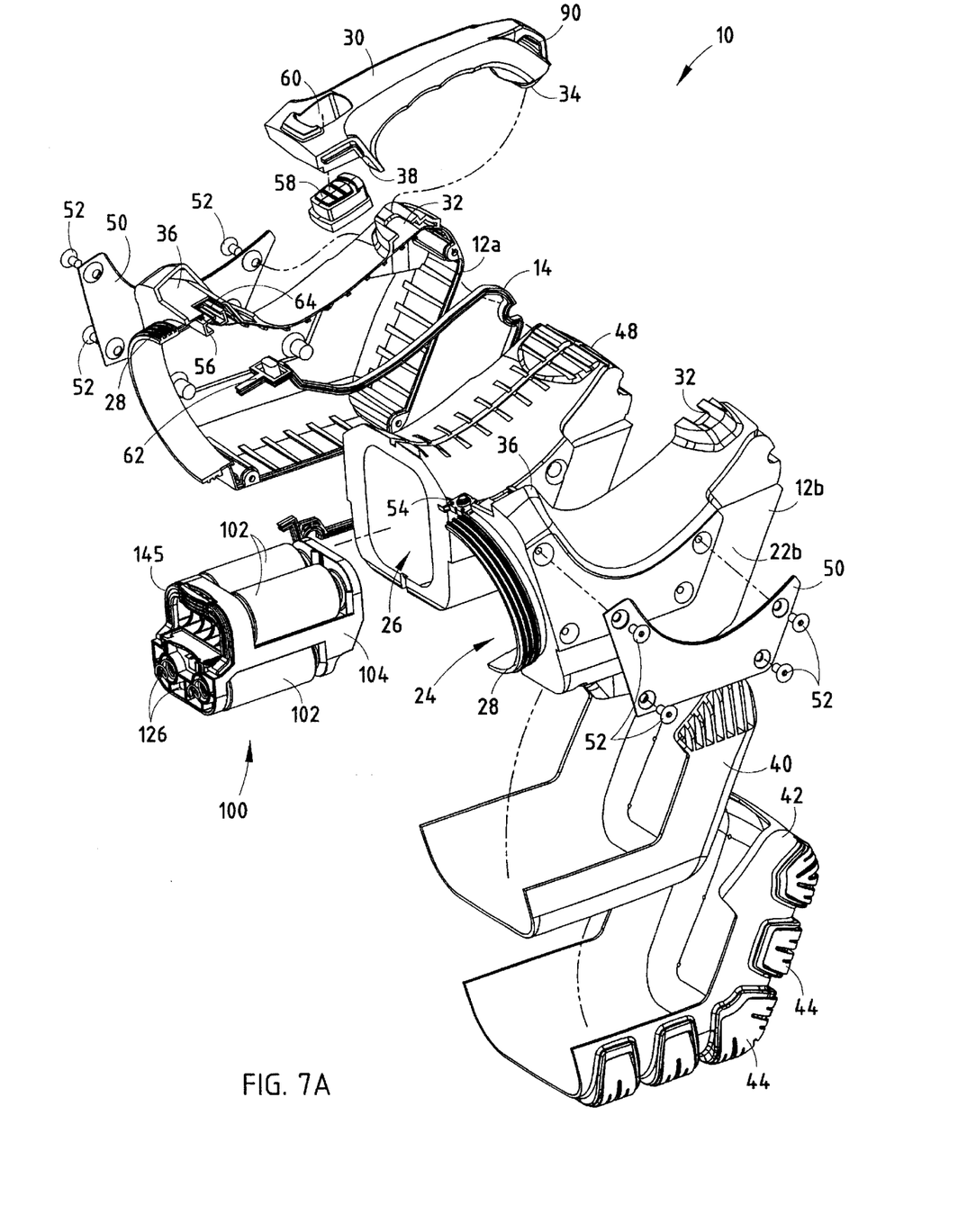
FIG. 7A is an exploded perspective view of the casing assembly for the lantern of the present invention.
Figure 7B:
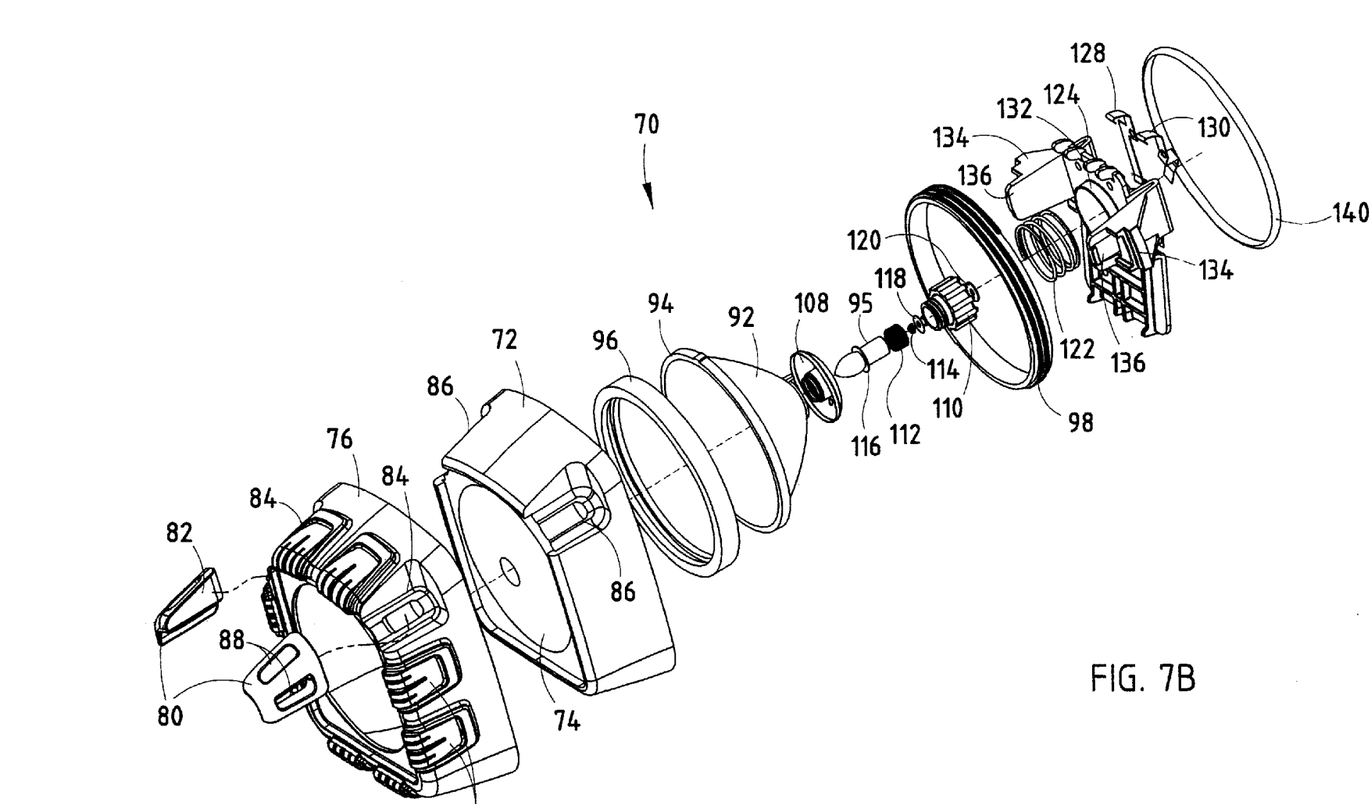
FIG. 7B is an exploded perspective view of a lens ring assembly used in the lantern of the present invention.

As best shown in FIGS. 7B and 8, the lantern further includes a lens ring assembly 70. Lens ring assembly 70 includes a lens ring 72 in which is disposed a lens 74. While lens 74 may be a separately formed component that is mounted within lens ring 72, lens ring 72 and lens 74 may be integrally formed so as to increase the structural integrity of the assembly, to reduce component count and cost, and to provide a more watertight lantern.

Lens ring assembly 70 also may include a lens ring cover 76 that covers substantially all of the exterior surface of lens ring 72 with the exception of the region serving as lens 74. Lens ring cover 76 may be made of a shock-absorbing material such as rubber and may include a plurality of treads 78 similar in appearance to treads 44. Lens ring cover 76 not only absorbs shock delivered to the lens ring area in front of the lantern, but also provides the advantage of blocking one's view of much of the lens ring 72 that may be made of a transparent material and integrally formed with lens 74. Lens ring cover 76 may be attached to lens ring 72 by adhesive or other fastening mechanism, such as that described further below.

As shown in FIG. 7B, lens ring assembly 70 may also include lens ring eyelets 80 that may be formed of a rigid plastic material. Eyelets 80 include a tongue 82 that extends through apertures 84 provided in lens ring cover 76 and into grooves 86 formed within lens ring 72. By forming eyelets 80 such that they will slide into and snap into grooves 86 of lens ring 72, eyelets 80 may serve the function of mechanically fastening lens ring cover 76 to lens ring 72. Insofar as lens ring cover 76 may be formed of rubber, portions thereof surrounding apertures 84 may serve as a gasket to provide a watertight seal for this mechanical connection. Lens ring eyelets 80 may be configured to include a pair of joined apertures 88 that define respective slots for connection of a shoulder strap (not shown) or the like. Such a shoulder strap could split into a "Y" and be connected to the slots 88 in each eyelet 80, with the opposite end of the strap being coupled to a slot 90 formed in the rear of handle 30.

Lens ring assembly 70 may further include a reflector 92 having a conventional parabolic or cup-like shape with an aperture formed in its rearward end for receipt of a light source 95. Reflector 92 preferably has a forward peripheral rim 94 having a diameter just slightly less than the internal diameter of lens ring 72 within which reflector 92 is supported. As best shown in FIG. 8, a reflector isolation gasket 96 having a U-shaped cross section with a central channel configured to receive peripheral rim 94 of reflector 92 is inserted between lens ring 72 and reflector 92. Although lens ring 72 may be integrally formed with lens 74 such that moisture ingress is not an issue with respect to the interface between the reflector 92 and lens ring 72, reflector isolation gasket 96 provides the advantage of isolating reflector 92, and hence light source 95, from excessive mechanical shock applied to the exterior of the lantern. As shown in FIG. 8, lens ring 72 includes a female threaded portion 106 for not only engaging threads 28 of casing 12, but also for engaging the threads of a reflector retaining ring 98. After reflector 92 and reflector isolation gasket 96 have been inserted into lens ring 72, retaining ring 98 is threaded into the threads 106 of lens ring 72 behind gasket 96 and peripheral rim 94 of reflector 92 so as to secure reflector 92 and the components carried on reflector 92 within lens ring 72.

Light source 95 may be any form of light source including an incandescent light bulb of the conventional type or an LED or other form of light source.

Lens ring assembly 70 may further include a contact shell 108 that is snapped into place at the rear of reflector 72 so as to facilitate electrical coupling of a terminal of light source 95 and to provide a mechanical mechanism for securing light source 95 to reflector 92 in combination with a lamp retainer 110. Specifically, lamp retainer 110 includes a forward male threaded portion that threads into a female threaded aperture provided in contact shell 108. A first lamp spring 112 is provided within retainer 110 to bias a collar 116 of lamp 95 forward against a portion of reflector 92 that is in electrical contact with contact shell 108. A second lower lamp spring 114 is provided between a contact rivet 118 and the bottom electrical terminal of lamp 95. Rivet 118, spring 114, and a washer 120 provide an electrical path to one terminal of light source 95 while the second electrical path is provided by contact shell 108, reflector 92, and a contact shell spring 122 that is disposed about lamp retainer 110 between a rear surface of contact shell 108 and a forward surface of a battery cartridge retainer 124.

Battery cartridge retainer 124 includes an electrical connector between contact shell spring 122 and one of a pair of coiled spring contact terminals 126 on battery cartridge 100. Supported on battery cartridge retainer 124 is a pair of electrical contact strips 128 and 130. Retainer 124 includes two pairs of upwardly extending ears for supporting upward portions of strips 128 and 130 so as to contact the bottom of switching mechanism 54. First strip 128 extends between switching mechanism 54 and one of contact terminals 126 on battery cartridge 100. Second strip 130 extends from switching mechanism 54 to an aperture 132 provided in retainer 124 so as to contact washer 120 provided at the rear of lamp retainer 110.

Battery cartridge retainer 124 is preferably configured so as to engage and snap into the open end 24 of casing 12. To this end, retainer 124 preferably includes a pair of resilient arms 134 that are configured to snap into place within opening 24 of casing 12 and then to be released by a pinching pressure applied to tabs 136 of arms 134. Thus, battery cartridge retainer 124 will secure battery cartridge 100 within battery compartment 26 even after lens ring assembly 70 has been removed from casing assembly 10.

As shown in FIGS. 7B and 8, the lantern may further include an O-ring 140 that is compressed between an interior surface of lens ring 72 and a portion of the cylindrical threaded protrusion 28 of casing 12. O-ring 140 provides a watertight coupling of lens ring 72 to casing 12.

Figure 9A:
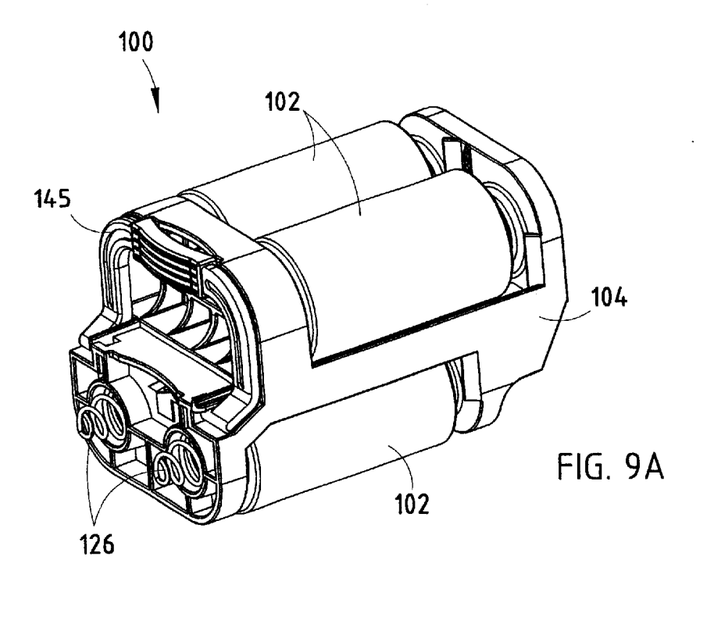
FIGS. 9A and 9B are perspective views showing the battery cartridge used with the lantern of the present invention.
Figure 9B:
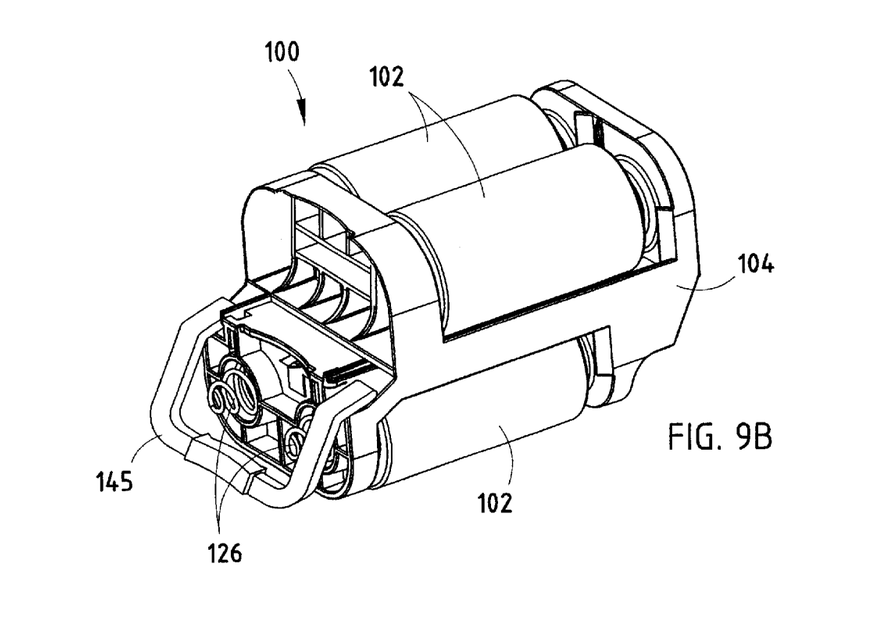

A battery cartridge constructed in accordance with the present invention is shown in detail in FIGS. 9A and 9B. As shown, battery cartridge 100 includes a cartridge support structure 104 that is an integrally molded piece, preferably made of plastic. In this particular embodiment, support structure 104 is configured to have four battery receptacles. As stated above, the four receptacles are preferably configured to support and electrically couple the four batteries in two rows of two batteries each, with an upper row laterally offset to the rear from the lower row so as to alter the center of gravity of the lantern in which it is utilized. Battery cartridge 100 includes a pair of coiled spring contact terminals 126 provided on a forward end thereof for electrical contact with conductive strips provided on battery cartridge retainer 124. Coiled spring contact terminals 126 also provide shock absorption to the batteries and cartridge when the lighting device is dropped on the lens ring.

To facilitate removal of battery cartridge 100 from battery compartment 26 defined within the shock absorber 48 in casing 12, a handle 145 is pivotally attached to the forward end of support structure 104. FIG. 9A shows battery cartridge 100 with handle 145 in a retracted position while FIG. 9B shows handle 145 in an extended position. Handle 145 would generally be retracted and folded against support structure 104 when battery cartridge retainer 124 is snapped into place. It will be noted, however, that retainer 124 is preferably configured with legs at its lower end so as to be inserted and then pivoted at its upward end until arms 134 snap into place. This would then cause handle 145, if previously extended, to be properly automatically folded upward into its fully retracted position without then interfering with the snapping in place of retainer 124. When batteries 102 need to be replaced, retainer 124 may be removed by pinching tabs 136 together and then handle 124 may be swung into its extended position (see FIG. 9B) to allow a user to easily pull battery cartridge 100 from within compartment 26. Handle 145 is particularly advantageous when utilizing a shock absorber 48 due to the snug resilient fit of battery cartridge 100 within the lined battery compartment 26.

While various aspects of the present invention have been disclosed as being used together, it will be appreciated by those skilled in the art that various aspects could be separately implemented in a portable lighting device. Nevertheless, the various aspects when combined provide synergistic effects with respect to the shock-absorbing tolerances of the lighting device. Based upon test results, a lantern constructed as depicted in the drawings and discussed above was capable of withstanding drop tests of in excess of 15 feet. This far surpasses that of any previously known lighting device.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A portable lighting device comprising:

a casing including a top, bottom, rear and opposing side surfaces, said casing including an open forward end, said bottom surface providing a first support surface on which the portable lighting device will rest when in a first resting position;

a reflector mounted within the open forward end of said casing;

a lens provided across the forward open end;

a light source disposed between said reflector and said lens; and a switching mechanism for selectively activating said light source, wherein said casing further includes an inclined surface extending between said bottom surface and said rear surface of said casing, said inclined surface providing a second support surface on which the portable lighting device will rest when in a second resting position, wherein said first support surface is configured to provide a stable and predictable contact area on which the portable lighting device will rest when in the first resting position and provides a stable first resting position such that the portable lighting device will remain in the first resting position without rolling, and wherein said second support surface is configured to provide a stable and predictable contact area on which the portable lighting device will rest when in the second resting position and provides a stable second resting position such that the portable lighting device will remain in the second resting position without rolling.

2. The portable lighting device of claim 1, wherein said casing defines a battery compartment and includes an open forward end, said battery compartment configured to receive four batteries arranged in two rows of two batteries each, said battery compartment further configured to maintain the batteries in a first row offset from the batteries in a second row.

3. The portable lighting device of claim 2 and further comprising a battery cartridge removably inserted in said battery compartment, said battery cartridge including a cartridge support including battery receptacles configured to receive four batteries arranged in two rows of two batteries each, said battery receptacles further configured to maintain the batteries in a first row offset from the batteries in a second row.

4. The portable lighting device of claim 3 and further comprising a battery cartridge retainer for releasably closing the open forward end of said casing and thereby retaining said battery cartridge in said casing.

5. The portable lighting device of claim 3, wherein said battery cartridge further includes a handle pivotally attached to said cartridge support structure for pivoting between a storage position and an extended position for facilitating removal/insertion of the battery cartridge into the battery compartment.

6. The portable lighting device of claim 1 and further comprising a base tray disposed over a portion of an exterior surface of said casing.

7. The portable lighting device of claim 6 and further comprising a base overmold disposed over said base tray and made of a shock absorbing material.

8. The portable lighting device of claim 7, wherein said base overmold is configured to cover said first and second support surfaces of said casing.

9. The portable lighting device of claim 8, wherein said base overmold is made of a material having a higher coefficient of friction than a material forming said casing.

10. The portable lighting device of claim 1, wherein said second support surface is inclined at an angle of about 45 degrees with respect to said first support surface.

11. The portable lighting device of claim 1, wherein said first and second support surfaces are substantially flat.

12. A portable lighting device comprising:
   a casing including a top, bottom, rear and opposing side surfaces, said casing including V an open forward end, said bottom surface providing a first support surface on which the portable lighting device may rest when in a first resting position;
   a reflector mounted within the open forward end of said casing;
   a lens provided across the forward open end;
   a light source disposed between said reflector and said lens; and
   a switching mechanism for selectively activating said light source,
   wherein said casing further includes an inclined surface extending between said bottom surface and said rear surface of said casing, said inclined surface providing a second support surface on which the portable lighting device may rest when in a second resting position,
   wherein said light source, reflector and lens are configured to project a beam of light having a central axis, wherein the central axis of the beam spot is inclined at a downward angle when the lighting device is resting on said first support surface.

13. A portable lighting device comprising:
   a casing defining a battery compartment and including an open forward end, said battery compartment configured to receive four batteries arranged in two rows of two batteries each, said battery compartment further configured to maintain the batteries in a first row offset from the batteries in a second row; and
   a light source selectively electrically coupled to batteries in said battery compartment.

14. The portable lighting device of claim 13 and further comprising a battery cartridge removably inserted in said battery compartment, said battery cartridge including a cartridge support including battery receptacles configured to receive four batteries arranged in two rows of two batteries each, said battery receptacles further configured to maintain the batteries in a first row offset from the batteries in a second row.

15. The portable lighting device of claim 14 and further comprising a battery cartridge retainer for releasably closing the open forward end of said casing and thereby retaining said battery cartridge in said casing.

16. The portable lighting device of claim 14, wherein said battery cartridge further includes a handle pivotally attached to said cartridge support structure for pivoting between a storage position and an extended position for facilitating removal/insertion of the battery cartridge into the battery compartment.

17. The portable lighting device of claim 14 and further comprising a shock absorber lining, at least a portion of said battery compartment to protect batteries contained in said battery cartridge from damage due to excessive shock applied to said casing.

18. The portable lighting device of claim 13 and further comprising a shock absorber lining at least a portion of said battery compartment to protect batteries contained therein from damage due to excessive shock applied to said casing.

19. A portable lighting device comprising:
   a casing defining a battery compartment;
   a shock absorber lining at least a portion of said battery compartment to protect batteries contained therein from damage due to excessive shock applied to said casing by physically and completely isolating the batteries from said casing; and
   a light source selectively electrically coupled to batteries in said battery compartment.

20. The portable lighting device of claim 19, wherein said shock absorber is a resiliently compressible material.

21. The portable lighting device of claim 20, wherein said resiliently compressible material is a foam material.

22. A portable lighting device comprising:
   a casing defining a battery compartment;
   a shock absorber lining at least a portion of said battery compartment to protect batteries contained therein from damage due to excessive shock applied to said casing;
   a light source selectively electrically coupled to batteries in said battery compartment; and
   a battery cartridge removably inserted jn the lined battery compartment for retaining batteries.

23. The portable lighting device of claim 22, wherein said battery compartment includes a cartridge support including battery receptacles configured to receive four batteries arranged in two rows of two batteries each, said battery receptacles further configured to maintain the batteries in a first row offset from the batteries in a second row.

24. The portable lighting device of claim 22, wherein said battery cartridge further includes a handle pivotally attached to said cartridge support structure for pivoting between a storage position and an extended position for facilitating removal/insertion of the battery cartridge into the lined battery compartment.

25. A portable lighting device comprising:
   a casing defining a battery compartment and having an open end for access to said battery compartment; and
   a lens ring assembly releasably attached to the open end of said casing, wherein said lens ring assembly comprises:
      a lens;
      a lens ring for supporting said lens and including connecting means for connecting said lens ring assembly to said casing;
      a light source;
      a reflector having a forward peripheral rim and a rear aperture for receiving said light source; and
      a gasket disposed between said forward peripheral rim of said reflector and an inner surface of said lens ring, said gasket being formed of a material capable of absorbing mechanical shocks so as to protect said light source from mechanical shocks delivered to said lens ring and/or casing.

26. The portable lighting device of claim 25, wherein said light source is an incandescent lamp bulb.

27. The portable lighting device of claim 25 and further comprising a lens ring cover made of a shock absorbing material and covering the exterior of said lens ring.

28. The portable lighting device of claim 25 and further comprising a reflector retaining ring inserted into and engaging said lens ring behind said reflector so as to retain said reflector in said lens ring.

29. The portable lighting device of claim 25, wherein said connecting means includes threads for engaging like threads on said casing.

30. The portable lighting device of claim 25 and further comprising an o-ring disposed between said casing and said lens ring for providing a watertight seal therebetween.

31. The portable lighting device of claim 25 and further comprising a battery cartridge removably inserted in said battery compartment for retaining batteries.

32. The portable lighting device of claim 31 and further comprising a shock absorber lining, at least a portion of said battery compartment to protect batteries contained in said battery cartridge from damage due to excessive shock applied to said casing.

33. The portable lighting device of claim 31 and further comprising a battery cartridge retainer for releasably closing the open end of said casing and thereby retaining said battery cartridge in said casing.

34. The portable lighting device of claim 33, wherein said battery cartridge includes coiled spring contact terminals for engaging contact tabs on said battery cartridge retainer.

35. The portable lighting device of claim 32 and further comprising a contact shell having a central opening for receiving said light source and for providing an electrical connection to said light source.

36. The portable lighting device of claim 34 and further comprising a contact shell spring disposed between said contact shell and said battery cartridge retainer.

37. The portable lighting device of claim 35 and further comprising a lamp retainer for securing said light source to said contact shell and said reflector.

38. The portable lighting device of claim 37 and further comprising a lamp spring disposed within said lamp retainer.

39. The portable lighting device of claim 25, wherein said casing comprises first and second casing halves and a gasket disposed between said casing halves.

40. The portable lighting device of claim 25 and further comprising armor plates disposed on sides of said casing.

41. The portable lighting device of claim 25 and further comprising a base tray disposed over a portion of an exterior surface of said casing.

42. The portable lighting device of claim 41 and further comprising a base overmold disposed over said base tray and made of a shock absorbing material.

43. A portable lighting device comprising:

a casing defining a battery compartment and being formed of at least two casing portions;

a gasket disposed between said casing portions;

a light source; and a switching mechanism electrically coupled between at least one terminal of a battery contained in said battery compartment and said light source, wherein said switching mechanism extends between said two casing portions to enable actuation by a user, and wherein said gasket includes an integrally formed resilient boot constituting a portion of said switching mechanism.

44. The portable lighting device of claim 43, wherein said gasket is configured to prevent water ingress into said casing.

45. A portable lighting device comprising:

a casing defining a battery compartment and being formed of at least two casing halves;

a gasket disposed between said casing portions; and a light source.

46. A portable lighting device comprising:

a casing defining a battery compartment;

a light source selectively electrically coupled to batteries in said battery compartment; and armor plates disposed on sides of said casing.

* * * * *